(12) United States Patent
Stein, III et al.

(10) Patent No.: US 6,297,892 B1
(45) Date of Patent: Oct. 2, 2001

(54) DEVICE FOR PROTECTING DATA TRANSMITTED BY A FACSIMILE MACHINE

(76) Inventors: William Stein, III; William Stein, IV, both of 4224 Houma Blvd., Suite 300, Metairie, LA (US) 70002

( * ) Notice: Subject to any disclaimer, the term of this patent is extended or adjusted under 35 U.S.C. 154(b) by 0 days.

(21) Appl. No.: 08/413,040

(22) Filed: Mar. 27, 1995

(51) Int. Cl.[7] .................................................. H04N 1/40
(52) U.S. Cl. .............................. 358/443; 358/442; 380/53
(58) Field of Search ................................. 358/442–443; 380/18, 43, 52

(56) References Cited

U.S. PATENT DOCUMENTS

| | | | |
|---|---|---|---|
| 3,715,478 | 2/1973 | Vasseur | 178/5.1 |
| 4,091,423 | 5/1978 | Branscome | 358/259 |
| 4,229,817 * | 10/1980 | Morgan et al. | 380/52 |
| 4,956,863 * | 9/1990 | Goss | 380/18 |
| 4,989,244 | 1/1991 | Naruse et al. | 380/20 |
| 5,159,635 | 10/1992 | Wang | 380/18 |
| 5,241,595 | 8/1993 | Kuno | 380/18 |
| 5,245,655 | 9/1993 | Buhn et al. | 380/18 |
| 5,321,749 * | 6/1994 | Virga | 380/18 |
| 5,351,136 | 9/1994 | Wu et al. | 358/440 |
| 5,398,283 * | 3/1995 | Virga | 381/18 |

* cited by examiner

Primary Examiner—Tommy Lee
Assistant Examiner—Stephen Brinich
(74) Attorney, Agent, or Firm—Keaty Professional Law Corporation

(57) ABSTRACT

The invention relates to a device for protecting data transmitted by a facsimile machine and provides for encrypting and decrypting of data converted to a binary code. The device is detachably connectable to a facsimile machine for receiving the data and for encrypting/decrypting the data in accordance with a pre-selected key. The encrypted data is stored by the device for subsequent retrieval upon demand. A keypad and an associated visual display allow programming of the electronic function of the device.

8 Claims, 2 Drawing Sheets

DEVICE FOR PROTECTING DATA TRANSMITTED BY A FACSIMILE MACHINE

BACKGROUND OF THE INVENTION

The present invention relates to communications equipment, and more particularly to a device for use with facsimile machines and/or computers to allow protected transmission and receipt of confidential messages.

The problem of ensuring confidentiality of facsimile transmissions has long been recognized in the communications industry. It is well known that facsimile transmissions can be received by non-designated addressee, and that confidentiality of the transmission can be easily compromised. To overcome this problem, various devices have been proposed for encoding an outgoing message, so that only a designated facsimile machine equipped with the key for decoding the message can decrypt the message into a readable form. Some of these devices can be found in, for example, U.S. Patent Nos.:

| U.S. PATENT NO. | ISSUE DATE |
| --- | --- |
| 3,715,478 | February 6, 1973 |
| 4,091,423 | May 23, 1978 |
| 4,989,244 | January 29, 1991 |
| 5,241,595 | August 31, 1993 |
| 5,321,749 | June 14, 1994 |
| 5,351,136 | September 27, 1994 |

Additionally, a number of devices have been patented for encoding textual data with the use of a computer. Some of these devices are disclosed in U.S. Patent Nos.

| U.S. PATENT NO. | ISSUE DATE |
| --- | --- |
| 5,159,635 | October 27, 1992 |
| 5,245,655 | September 14, 1993 |

Standard facsimile machines use optical scanners for reading the message to be transmitted, with the image then being changed into a binary code, and then encoded into a dual tone modulated frequency (DTMF) signal suitable for facsimile transmission. The receiving facsimile machine converts the DTMF signal into a binary code, which is then decoded to receive the textual or graphic image transmitted by the first facsimile machine.

Many of the known devices utilize decoding electronic means which are built into the facsimile machine and which can be activated by the user with the use of a keyboard or a computer.

Some of these devices also have means for storing the encoded information which can be retrieved by a user who possesses the password or a decoder.

However, none of the known devices discloses a portable device which can be easily connected to a standard facsimile machine to receive the intended message and to store the information until the user is ready to read it through a facsimile machine or a computer.

SUMMARY OF THE INVENTION

It is, therefore, an object of the present invention to provide a portable device for storing and transmitting an encoded message.

It is another object of the present invention to provide a device for encoding facsimile messages at the time when the textual or graphic image is changed into a binary code.

It is a further object of the present invention to provide a device for storing facsimile messages which can be connected to a computer or standard facsimile machine for printing of decoded messages.

These and other objects of the present invention are achieved through a provision of a device for protecting data transmitted by a facsimile machine. The device comprises a lightweight detachable portable housing which can be attached to a free standing facsimile machine or directly to a telephone line. Mounted within the housing is a keypad and a visual display associated with the keypad for transmitting command signals to an electronic circuitry mounted within the housing.

The electronic circuitry allows to encrypt the data received by the facsimile machine and to store the encrypted data for the subsequent retrieval upon demand of the user. When the retrieval signal is transmitted to the electronic circuitry, the data is either transmitted in an encrypted form to a receiving facsimile machine, where it is decrypted in accordance with the matching code, or is decrypted by a similar device which is attached to a remote facsimile machine. The encrypting and decrypting of the data is accomplished at the level of converting the data to a binary code.

An optional encoder/decoder of dual tone modulated frequency signal is provided if the device is to be connected to a telephone line or to a computer equipped with input/output ports. The device is equipped with an independent power source to allow functioning of the device independently of a facsimile machine or a computer.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Figure 1:
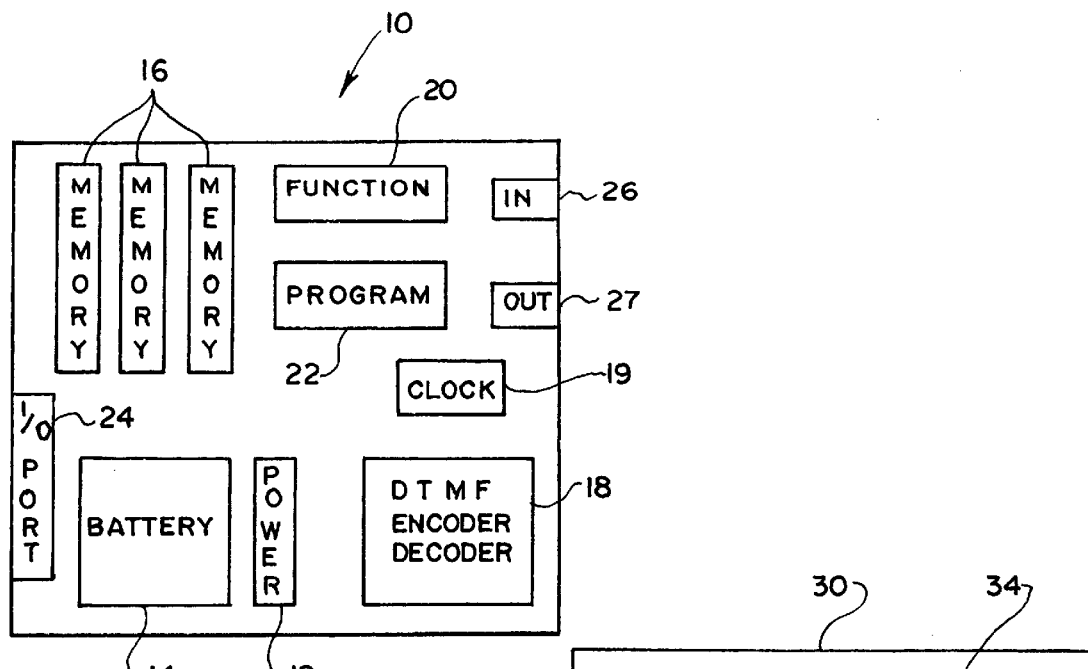
FIG. 1 is a schematic view of the first embodiment of the device in accordance with the present invention.

Turning now to the drawings in more detail, numeral 10 designates the electrical circuitry utilized in the device in accordance with the present invention. As can be seen in FIG. 1, the electrical circuitry comprises a power supply 12 and a battery 14 to allow the device to receive and store information independently from a source of AC power. The device comprises at least one memory chip 16 which is adapted to store the received information, a DTMF encoder/decoder 18 for encrypting and decrypting of data transmitted by a facsimile machine. The electronic portion of the device in accordance with the present invention can also include an optional clock chip 19 to allow time identification of received/transmitted messages. Suitable function chip 20 and program chip 22 allow to perform the necessary operations and mathematical functions with the use of keypad 30 shown in FIG. 2.

The device is also provided with suitable means 24 to allow connecting of the device to a computer or facsimile machine, such as an input/output port for connection to a computer or a facsimile machine. "In" and "out" phone lines 26 and 28 respectively, are provided to receive and transmit the data via phone lines.

Figure 2:
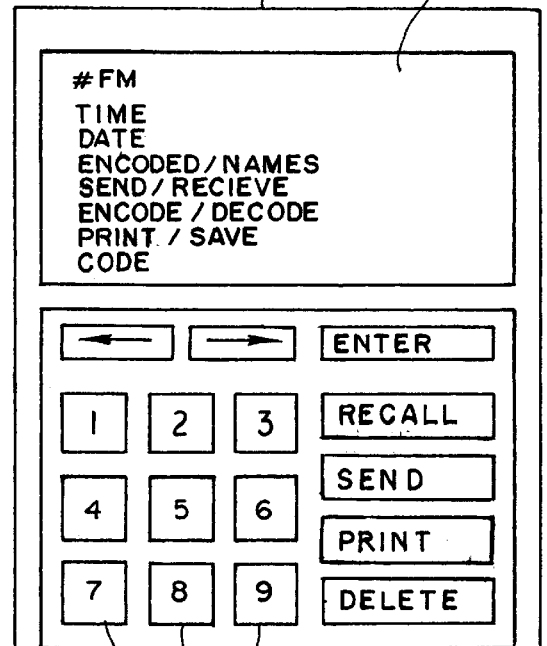
FIG. 2 is a schematic view illustrating a keypad for use with the device of the present invention.

Turning now to FIG. 2, the keypad which allows the user to transmit instructional signals to the electronic circuit 10 is illustrated. The keypad is conveniently provided with a number of functional keys, such as "recall", "send", "print", "delete", and "enter." These functional keys are used in cooperation with numerical keys designated by numeral 32 in the drawings. The keypad permits the user to input various instructions for the operation of the device and for inputting the key code used for encrypting and decrypting of messages.

A video display window 34 allows the user to visually monitor the functions selected with the use of the keypad 30. The window 34 can be a standard LED display.

Figure 3:
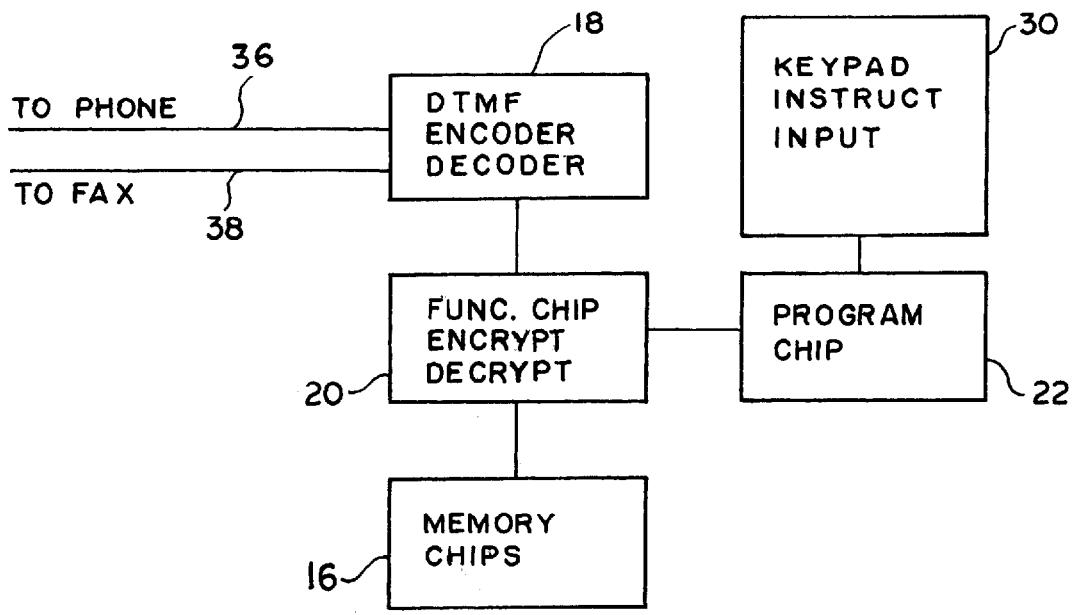
FIG. 3 is a schematic illustration of operation of the device in accordance with the present invention connected between the phone line and a facsimile machine.

FIG. 3 illustrates, in a schematic form, the function of the device in accordance with the present invention. The user inputs his instructions on a keypad 30 and transmits instructions to the program chip 22. The program means 22 transmits the signal to the means for encrypting and decrypting messages which is made in the form of a function chip 20. If the message is to be transmitted immediately, the signal is passed (chip to chip) to the DTMF encoder/decoder means 18 and then to a phone line 36. Alternatively, the message from the encoding/decoding means can be transmitted to a facsimile machine to be read through a line 38.

If the user desires to retain the message in the memory of the device, the signal is forwarded to the data storage means 16 for storing the information in the memory chip instead of being forwarded immediately to the encoder/decoder means 18. In accordance with the present invention, a mathematical algorithm based on Boulean algebraic x/or function is used to encrypt the binary code by changing the binary code in accordance with a predetermined key code.

The new binary code in its encrypted form is then changed into a DTMF signal and transmitted through the phone line 36 or through the fax line 38 to the addressee. At the receiving end, the DTMF signal is decoded to retrieve the encrypted binary code which is then decrypted using the matching key code to allow printing of the message in a readable form. Unless the addressee of the message uses a matching key code, the massage is printed in a scrambled form unsuitable for reading.

As part of the encryption process, a marker is inserted into the usual stream of the fax transmission to identify this particular message as encrypted. Once the device identifies the incoming facsimile message as encrypted, it scans for the key code. If this code has been entered by the addressee, the received message is decrypted and printed in the usual manner.

However, if the key code has not been entered, the message is stored in memory until the addressee enters the key code and instructs the device to decrypt and print the facsimile message. The device of the present invention can also be used for storing non-encoded facsimile messages until such time as the user is ready to recall and print the message.

Figure 4:
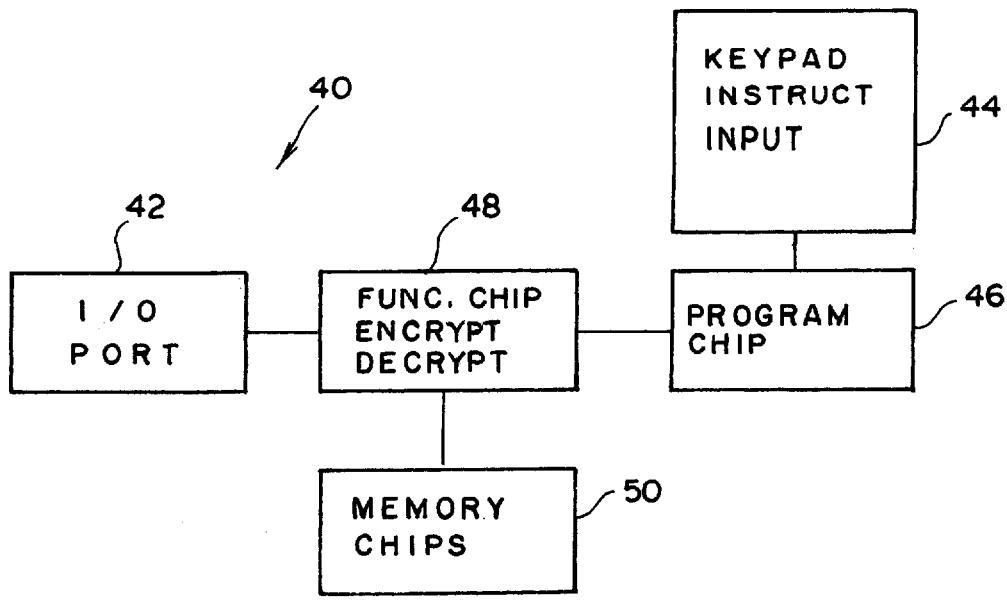
FIG. 4 is a schematic view of a second embodiment of the device in accordance with the present invention suitable for direct attachment to an existing facsimile machine through an input/output port.

FIG. 4 illustrates a second embodiment of the device in accordance with the present invention designated by numeral 40 in the drawings. The device 40 is adapted for direct attachment to an existing facsimile machine through a built-in input/output port 42 or through an internal buss in a facsimile machine or computer. The battery and the power supply are illustrated at 71, FIG. 5 in the embodiment. The device 40, similarly to the device 10 provides for the use of an instruction input keypad 44, which is used for directing the programs of the device 40 through a programming means 46. The instructions can direct an encrypting/decrypting means 48 to immediately encrypt or decrypt the transmitted message or, in the alternative, to store the information in the data storage means 50. The DTMF chip is omitted here, since it is part of a standard facsimile machine.

The device shown in FIG. 4 can be used for retrofitting existing facsimile machines supplied with input/output ports to provide encryption and decryption functions to the existing machine. The incoming facsimile message can be stored in the data storage means 50 until the user is ready to retrieve the message and has introduced the matching key code to allow decryption.

The device 40 has direct access to the binary code of a standard facsimile machine and can function without DTMF encoder/decoder chips. The binary code produced by the facsimile machine is immediately encrypted for outgoing messages before being converted to a DTMF signal or decrypted from incoming facsimile messages after being converted from the incoming DTMF signal.

Figure 5:
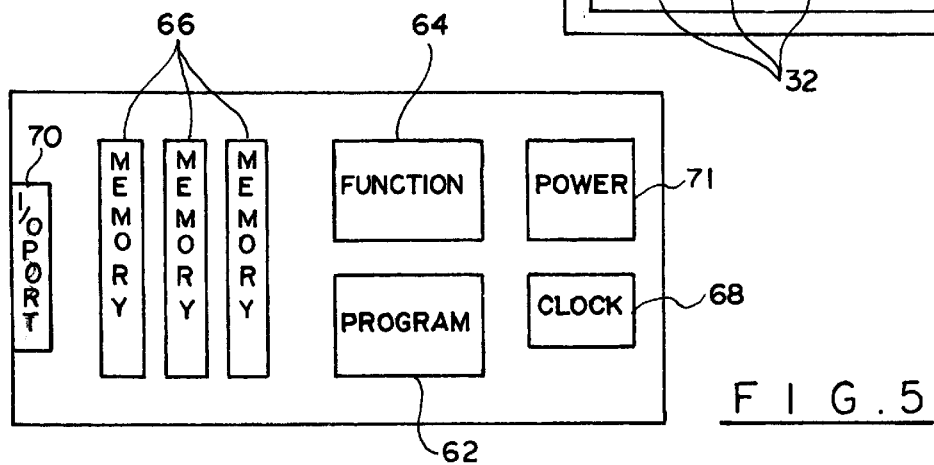
FIG. 5 is a schematic view of a third embodiment of the device in accordance with the present invention adapted for direct attachment to an existing facsimile machine through an input/output port and adapted for performing encryption and decryption functions.

Turning now to FIG. 5, a third embodiment of the device in accordance with the present invention is shown in its schematic form. The device 60 is provided with a means for programming the messages 62, means for encrypting/decrypting messages 64 and means for storing information 66. A clock 68 can be optionally provided for identifying the time of the transmission or reception.

The device 60, similar to the first embodiment 10 and the second embodiment 40 is provided with an input/output port 70. The third embodiment can be also used for direct attachment to a computer or an existing facsimile machine. The key board can be the same as that used for the first embodiment of the present invention.

All of the embodiments contain means for storing data and encrypting/decrypting messages. The received information can be stored until a device is connected to a suitable printing means, such as a computer or a standard facsimile machine. The incoming facsimile message can be stored encrypted until the recipient inputs the code allowing decryption of the message. It is one of the advantages of the present invention that the device can be connected to a phone line to receive facsimile messages without attachment to a receiving facsimile machine. The incoming fax message can be stored encrypted or decrypted, as the user selects, until such time as the user is ready to print the message.

Similarly, an outgoing facsimile message can be stored in the device and be transmitted, or encrypted and transmitted at a later time. The device can be attached to a standard facsimile machine since the data storage means allow to retain the information for an indefinite period of time. The device of the present invention can be detached and transported whenever the user desires and then reattached to a telephone line for transmission of the messages or for reception.

It is preferred that the device of the present invention be made lightweight to allow its ready portability. As will be appreciated, by those skilled in the art, the device of the present invention can be made a part of a standard facsimile machine with minor necessary amendments. In that case, the encryption and decryption of messages will be performed by the same facsimile machine that transmits or receives messages. The device may comprise a light weight detachable portable housing or insertable input/output card.

Many changes and modifications can be made in the design of the present invention without departing from the spirit thereof. I, therefore, pray that my rights to the present invention be limited only by the scope of the appended claims.

What is claimed is:

1. A device for protecting data transmitted by a facsimile machine, comprising:
    a lightweight self-contained detachable, portable housing provided with means for encrypting and decrypting data converted to a binary code;
    a means for storing encrypted data for subsequent retrieval upon demand;
    a means for selectively storing the transmitted data in a decrypted form for subsequent retrieval upon demand; and
    a means mounted in said housing for transmitting program signals to said means for encrypting and decrypting the data, said means comprising a keypad with a plurality of command keys and a visual display operationally connected to the keypad.

2. The device of claim 1, further comprising means for connecting the housing to an independent facsimile machine to allow receiving and transmitting of the encrypted data.

3. The device of claim 1, further comprising an independent power source positioned in said housing.

4. The device of claim 1, further comprising means mounted in said housing for encoding and decoding a dual tone modulated frequency signal.

5. The device of claim 1, further comprising means mounted in said housing for connecting the device to a telephone line to allow transmission of an encrypted data to a remote facsimile machine.

6. A device for protecting data transmitted by a facsimile machine, comprising:
    a lightweight self-contained detachable portable housing provided with means for receiving data transmitted by a facsimile machine;
    a means mounted in said housing for encrypting and decrypting the data converted to a binary code;
    a means mounted in said housing for transmitting program signals to said means for encrypting and decrypting the data, said means for transmitting signals comprising a keypad with a plurality of command keys and a visual display associated with said housing;
    a means mounted in said housing for storing encrypted data for subsequent retrieval of the data upon demand;
    a means for selectively storing the transmitted data in a decrypted form for subsequent retrieval upon demand; and
    a means mounted in said housing for connecting the device to a telephone line to allow receipt from and transmission of an encrypted data to a remote facsimile machine.

7. The device of claim 6, further comprising means mounted in said housing for encoding and decoding a dual tone modulated frequency signal.

8. The device of claim 6, further comprising an independent power source mounted in said housing.

* * * * *